United States Patent
Kudikala et al.

(10) Patent No.: US 9,934,018 B2
(45) Date of Patent: Apr. 3, 2018

(54) ARTIFACT DEPLOYMENT

(75) Inventors: Shravan K. Kudikala, Hyderabad (IN); Amar A. Shah, Pune (IN)

(73) Assignee: International Buisness Machines Corporation, Armonk, NY (US)

( * ) Notice: Subject to any disclaimer, the term of this patent is extended or adjusted under 35 U.S.C. 154(b) by 1377 days.

(21) Appl. No.: 12/728,242

(22) Filed: Mar. 21, 2010

(65) Prior Publication Data

US 2011/0231471 A1    Sep. 22, 2011

(51) Int. Cl.
*G06F 15/16* (2006.01)
*G06F 9/445* (2018.01)

(52) U.S. Cl.
CPC ..................... *G06F 8/65* (2013.01)

(58) Field of Classification Search
CPC .................................................. G06F 9/5011
See application file for complete search history.

(56) References Cited

U.S. PATENT DOCUMENTS

| 7,219,344 B2* | 5/2007 | Chenelle et al. ............. 717/177 |
| 2004/0230984 A1 | 11/2004 | Adams et al. |
| 2005/0282637 A1* | 12/2005 | Gatto et al. .................... 463/42 |
| 2006/0048141 A1* | 3/2006 | Persson .................... G06F 8/61 717/176 |
| 2006/0080658 A1* | 4/2006 | Marion et al. ................ 717/177 |
| 2007/0240145 A1 | 10/2007 | Saroj et al. |
| 2008/0108437 A1* | 5/2008 | Kaarela ................... G07F 17/32 463/42 |
| 2008/0209414 A1* | 8/2008 | Stein ............................ 717/173 |
| 2010/0056268 A1* | 3/2010 | Langan .................. A63F 13/12 463/29 |
| 2010/0306267 A1* | 12/2010 | Zamkoff et al. ............. 707/783 |

OTHER PUBLICATIONS

"IBM Service Management Framework Extension for Relocatable Services," IBM White Paper, Mar. 16, 2004.

\* cited by examiner

*Primary Examiner* — Richard G Keehn
(74) *Attorney, Agent, or Firm* — Scully, Scott, Murphy & Presser, P.C.; Stephen Yoder, Esq.

(57) ABSTRACT

A computing device communicates with a different computing device over a network. The computing device and the different computing device communicate with one another in a peer-to-peer architecture such that the computing device and the different computing device are peers to one another. An agent is executed on the computing device and receives an artifact deployed at the different computing device for deployment at the computing device. The agent receives the artifact via a user-initiated command. A run-time engine is executed on the computing device at which the artifact is to be deployed. After the user-initiated command has been triggered, the agent receives and deploys the artifact without further user interaction.

20 Claims, 5 Drawing Sheets

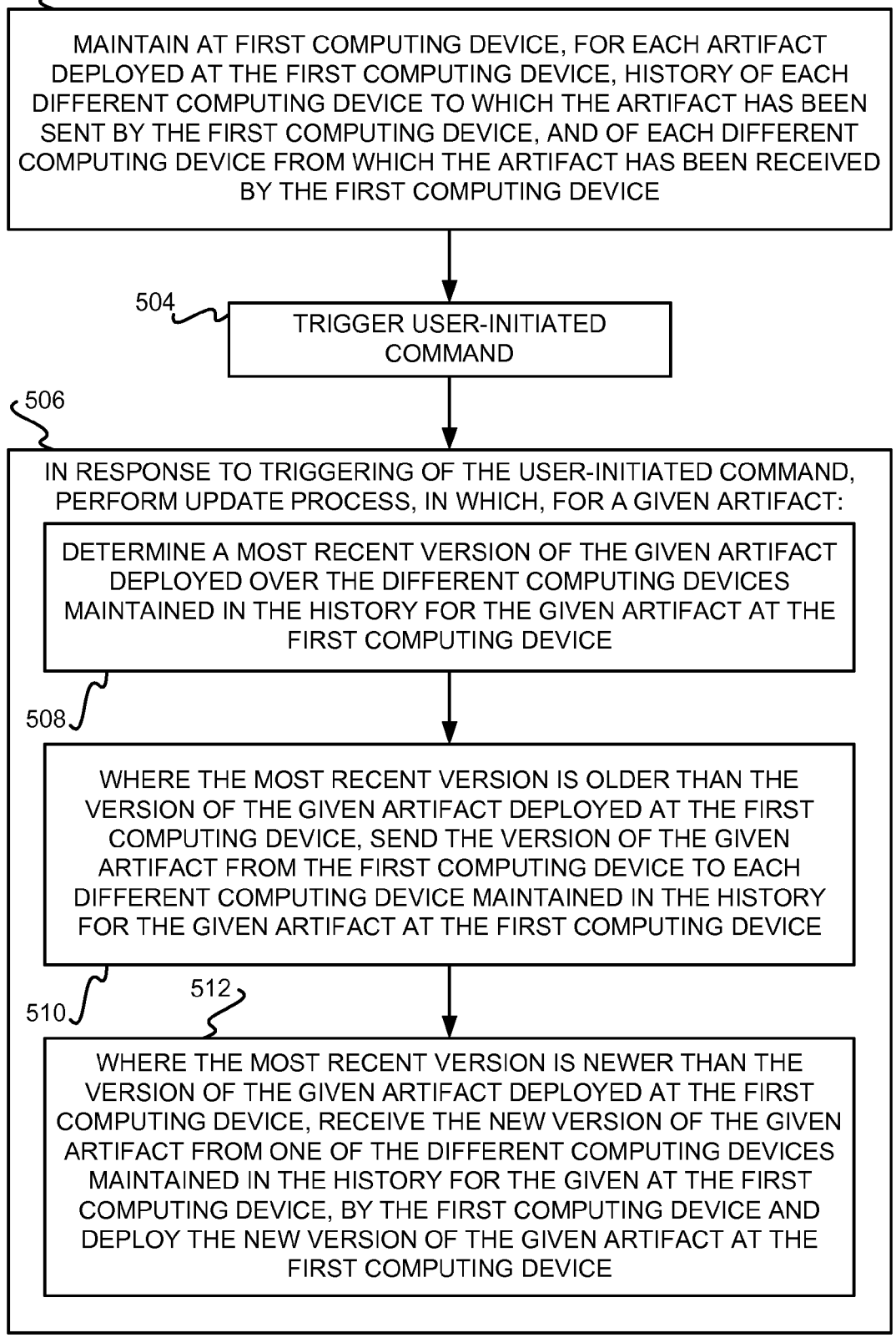

ARTIFACT DEPLOYMENT

BACKGROUND

An artifact is an object that is developed using a software tool or a software product, and generally is a resource or other output created by the software tool or product that contains business implementation logic. In enterprises and other organizations, there may be a variety of different environments in which artifacts are deployed. For example, an artifact may first be deployed within a development environment. Once the artifact has been developed, it may be deployed within a testing environment, and after testing has been completed, the artifact may be deployed within a quality assurance environment. Ultimately, the artifact may be deployed within a production environment, in which the artifact is actually used by end users.

BRIEF SUMMARY

A computing device of an embodiment of the invention includes a processor, communication hardware, an agent, and a run-time engine. The communication hardware is to communicate with a different computing device over a network. The computing device and the different computing device communicate with one another in a peer-to-peer architecture such that the computing device and the different computing device are peers to one another. The agent is executed by the processor and is to receive an artifact deployed at the different computing device and to deploy the artifact at the computing device. The agent is to receive the artifact via a user-initiated command. The run-time engine is executed by the processor at which the artifact is deployed. After the user-initiated command has been triggered, the agent is to receive the artifact and deploy the artifact at the computing device without further user interaction.

A method of an embodiment of the invention includes communicating between a first computing device and a second computing device in a peer-to-peer manner such that the first and the second computing devices are peers to one another. The method includes triggering of a user-initiated command. In response to triggering of the user-initiated command, the method receives an artifact by the first computing device from the second computing device, and deploys the artifact at the first computing device. After the user-initiated command has been triggered, the artifact is received by the first computing device and deployed at the first computing device without further user interaction.

A computer program product of an embodiment of the invention includes a computer-readable storage medium having computer-readable code embodied therein. The computer-readable code is executable by a computing device communicating with a different computing device in a peer-to-peer manner such that the first and the second computing devices are peers to one another. The computer-readable code includes first computer-readable code to, in response to triggering of a user-initiated command, receive the artifact by the computing device from the different computing device. The computer-readable code further includes second computer-readable code to deploy the artifact at the computing device. After the user-initiated command has been triggered, the artifact is received by the computing device and deployed at the computing device without further user interaction.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

FIG. 5 is a flowchart of a method, according to still another embodiment of the present invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

Figure 1:
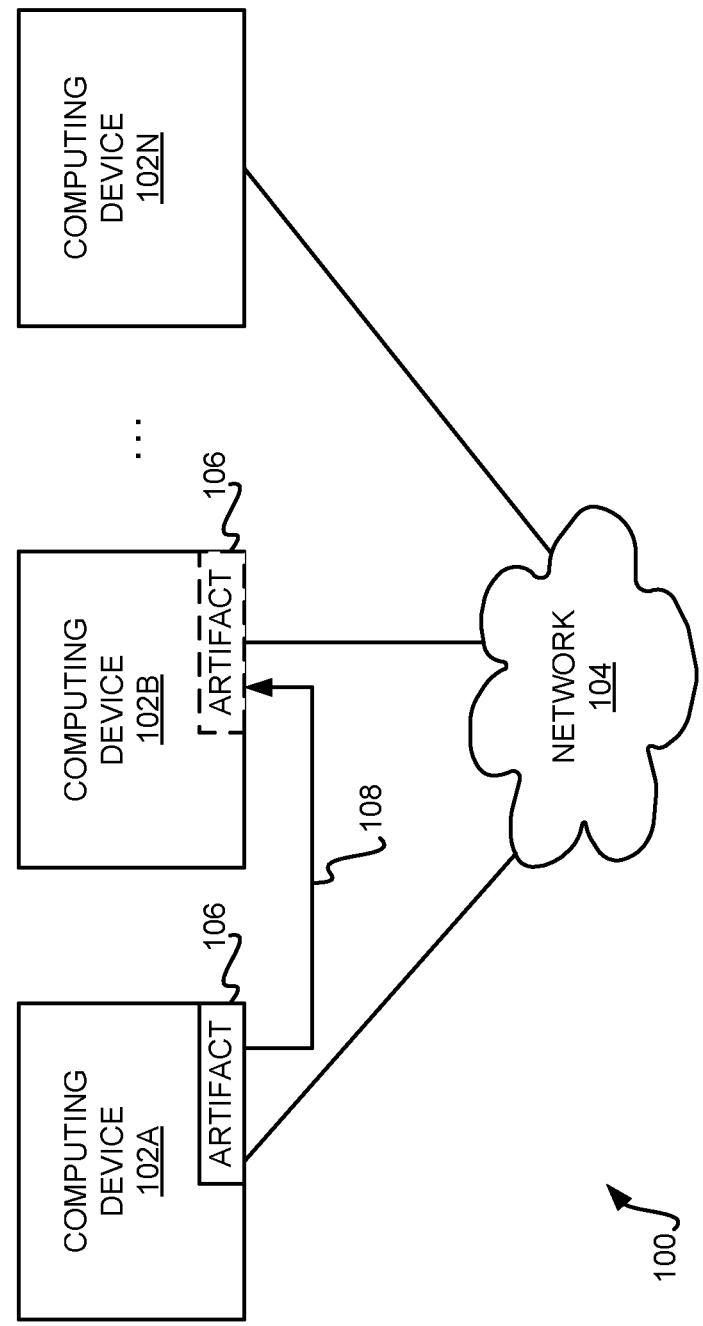
FIG. 1 is a diagram of a system, according to an embodiment of the present invention.

FIG. 1 shows a system 100, according to an embodiment of the invention. The system 100 includes a number of computing devices 102A, 102B, . . . , 102N, collectively referred to as the computing devices 102. The computing devices 102 may be servers, for instance. The computing devices 102 are communicatively interconnected to one another via a network 104.

The computing devices 102 are communicatively interconnected to one another in a peer-to-peer manner, as opposed to in a client-server manner. As such, each computing device 102 is a peer to each other computing device 102. Furthermore, this means that, as described in detail below, each computing device 102 can both send an artifact to another computing device 102 for deployment at this latter computing device 102, and receive an artifact from the latter computing device 102 for deployment at the former computing device 102. By comparison, in a client-server model, a server computing device typically sends code to client computing devices for installation at the client computing devices, and the client computing devices do not send code to the server computing device for installation at the server computing device.

In the system 100, an artifact already deployed on one computing device 102 can be deployed on any other computing device 102. However, exemplary description is provided in relation to one artifact 106 deployed on the computing device 102A being deployed on the computing device 102B, as indicated by the arrow 108 in FIG. 1. In this context, the computing device 102A is referred to herein as the first computing device and the computing device 102B is referred to herein as the second computing device, to clearly differentiate the computing devices 102A and 102B from one another. More generally, though, one or more artifacts can be deployed from any computing device 102 to one or more other computing devices 102.

Figure 2:
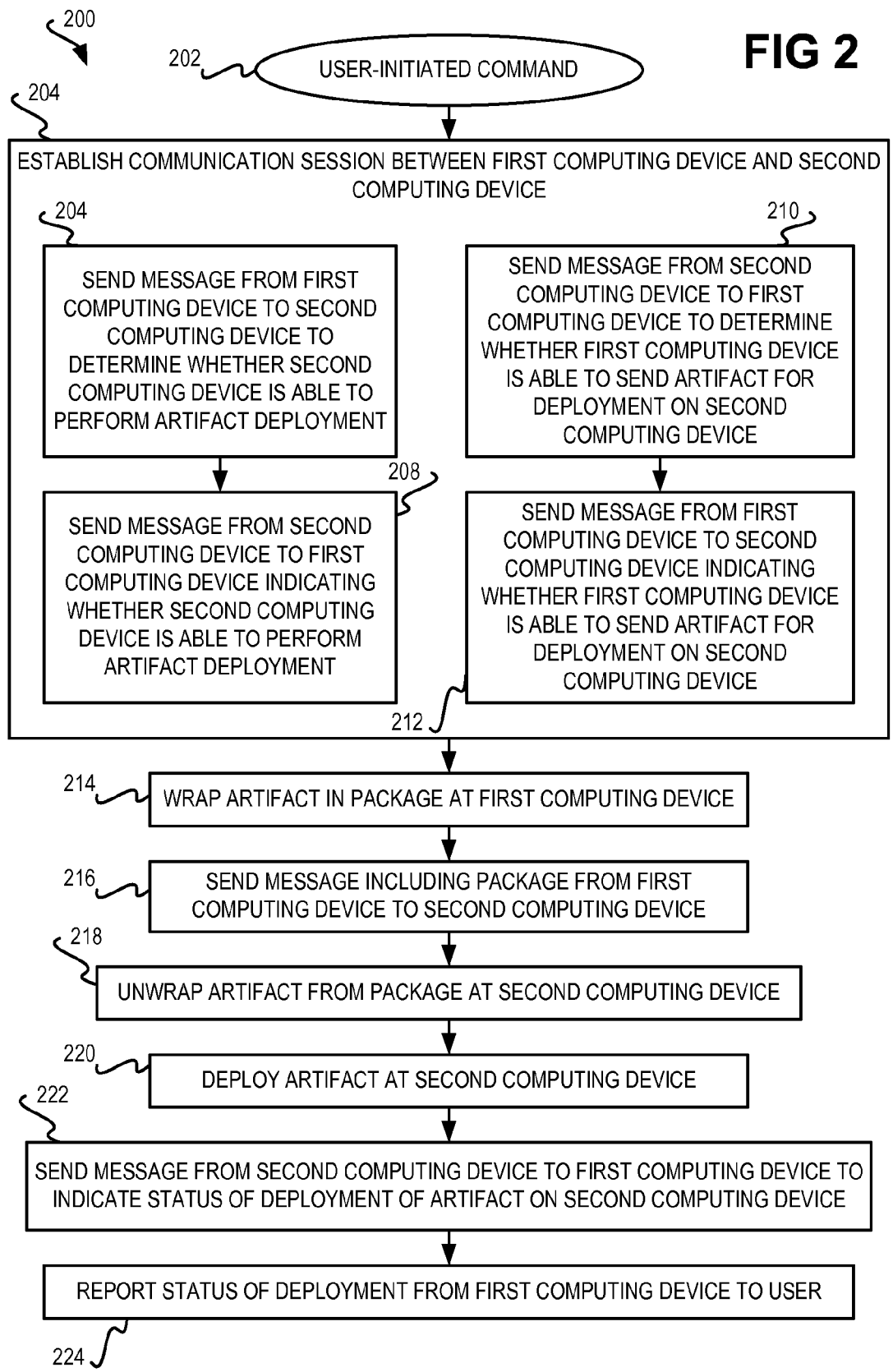
FIG. 2 is a flowchart of a method, according to an embodiment of the present invention.

FIG. 2 shows a method 200 for deploying an artifact from a first computing device to a second computing device, according to an embodiment of the invention. A user initiates a command to indicate that an artifact deployed on the first computing device is to be deployed on the second computing device (202). Responsive to the user-initiated command, a communication session is established between the first computing device and the second computing device (204). The communication session is for deploying the artifact in question from the first computing device to the second computing device.

Figure 3:
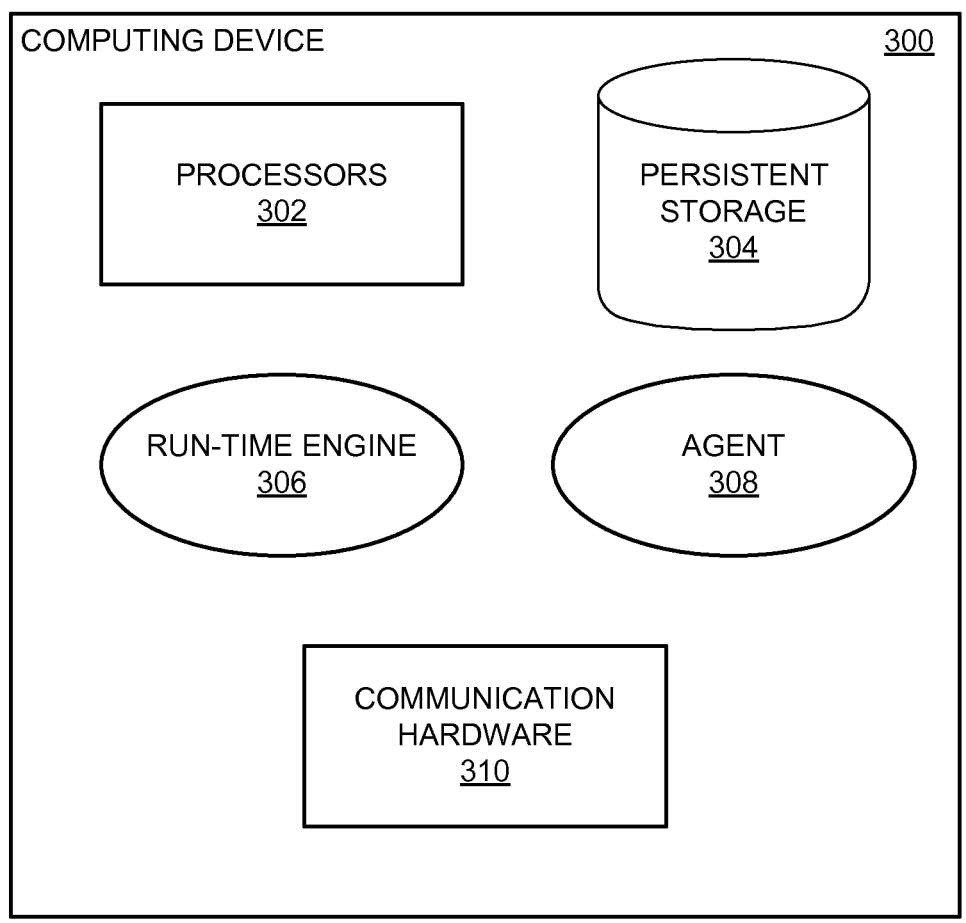
FIG. 3 is a diagram of a computing device, according to an embodiment of the present invention.

In one embodiment, the communication session is established by the first computing device, in direct response to receipt of the user-initiated command, sending a message to the second computing device to indicate whether the second computing device is able to deploy the artifact (206). That is, the first computing device inquires whether the second computing device is capable of automatically deploying the artifact without user interaction. In response, the second computing device sends a message to the first computing device indicating whether the second computing device is able to perform such artifact deployment (208). In the context of FIG. 3, it is presumed that the second computing device is able to perform artifact deployment.

In another embodiment, the communication is established by the second computing device, in direct response to receipt of the user-initiated command, sending a message to the first computing device to determine whether the first computing device is able to send the artifact for deployment on the second computing device (210). That is, the second computing device inquires whether the first computing device is capable of sending the artifact to the second computing device without user interaction. In response, the first computing device sends a message to the second computing device indicating whether the first computing device is able to perform such artifact transmission (212). In the context of FIG. 3, it is presumed that the first computing device is able to send the artifact for deployment on the second computing device.

After the communication session has been established, the first computing device wraps the artifact in a package (214). A package is an object that contains the artifact, as well as information regarding the artifact, such as definitions, platform-specific information pertaining to the artifact, the location or target of the artifact, and so on. A message including the package that contains the artifact is then sent from the first computing device to the second computing device (216). The second computing device unwraps the artifact from the package (218), and the artifact is deployed at the second computing device (220). It is noted that after the user initiates the command in part 202, no user interaction occurs within the method 200 in subsequent parts.

The second computing message then sends a message to the first computing device to indicate the status of the deployment of the artifact on the second computing device (222). For example, the status may indicate that the artifact has been successfully deployed, or has been unsuccessfully deployed, on the second computing device. The first computing device in turn reports the status of this deployment to the user (224). It is noted that the first computing device reports the status to the user, even if the user sent the command to the second computing device in part 202.

The messages that are employed within the method 200 may be formatted in a markup language, such as the extendible markup language (XML), or another type of markup language. Furthermore, the protocol over which the messages can be transmitted between the first and the second computing devices is not limited by embodiments of the invention. Example such protocols include the transmission control protocol/Internet protocol (TCP/IP) and the file transfer protocol (FTP), as well as other protocols.

FIG. 3 shows a representative computing device 300, according to an embodiment of the invention. The computing device 300 can implement each computing device 102 of FIG. 1, and each of the first and the second computing devices described in the method 200 of FIG. 2. This means, for instance, that the computing device 300 can both receive artifacts from another computing device for deployment at the computing device 300, and send artifacts to another computing device for deployment at this other computing device. The computing device 300 includes one or more processors 302, as well as persistent storage 304, such as a hard disk drive or another type of non-volatile storage. The computing device 300 can and typically will include other hardware, in addition to the processors 302 and the persistent storage 304, such as communication hardware 310.

The persistent storage 304 stores state information. The state information can include the identities and network addresses of other computing devices within the system of which the computing device 300 is a part. The state information can also include the number and identities of the artifacts installed (i.e., deployed) on all the computing devices within the system of which the computing device 300 is a part. The state information can further include the types of deployment-oriented messages that the computing device 300 can receive and send to perform deployment of artifacts.

The state information thus includes a history, maintained at the computing device 300, for each artifact that the computing device 300 sent to a different computing device or received from a different computing device. Each time the computing device 300 sends an artifact to another computing device, the version of the artifact that was sent to this other computing device and the identity of this other computing device are stored in the history for the artifact in question. Likewise, each time the computing device 300 receives an artifact from another computing device, the version that was received from this other computing device and the identity of this other computing device are stored in the history for the artifact in question.

Therefore, as artifacts are sent and received by the computing device 300, histories for the artifacts are maintained as part of this state information. As such, over time, each computing device will effectively build up an intelligent view of artifact deployment. This intelligence can be used when it is desired to perform an update process between two computing devices, as is described later in the detailed description. That is, maintenance of this history for each artifact deployed at the computing device 300 permits update processes to be easily performed between the computing device 300 and one or more other computing devices, as is described later in the detailed description.

The computing device 300 includes software, specifically a run-time engine 306 and an agent 308. The computing device 300 can and typically will include other software, in addition to the run-time engine 306 and the agent 308. All this software is executed by the processors 302. In one embodiment, the agent 308 can be contained within the run-time engine 306, which is not specifically depicted in FIG. 3.

The run-time engine 306 is the software component of the computing device 300 at which the artifact is installed (i.e., deployed). More generally, the run-time engine 306 is the software component that actually processes the business logic contained within the artifact. That is, the run-time engine 306 is the environment in which the business logic is executed.

The agent 308 sends and receives the messages in the method 200, depending on whether the computing device 300 is the first computing device or the second computing device. The agent 308 wraps the artifact in a package and sends the package in a message to another computing device, where the computing device 300 is the first computing device. The agent 308 unwraps the artifact from a package and deploys the artifact at the run-time engine 306, where the computing device 300 is the second computing device. The agent 308 also maintains the history for each artifact that has been described.

The communication hardware 310 permits the computing device 300 to communicate with other computing devices over a network. As noted above, the computing devices communicate with one another in a peer-to-peer manner. As such, the computing devices, including the computing device 300, can each both send artifacts to and receive artifacts from other computing devices. When the computing device 300 receives an artifact from another computing device, the device 300 deploys the artifact. When the computing device 300 sends an artifact to another computing device, the computing device that received the artifact from the device 300 deploys the artifact.

Figure 4:
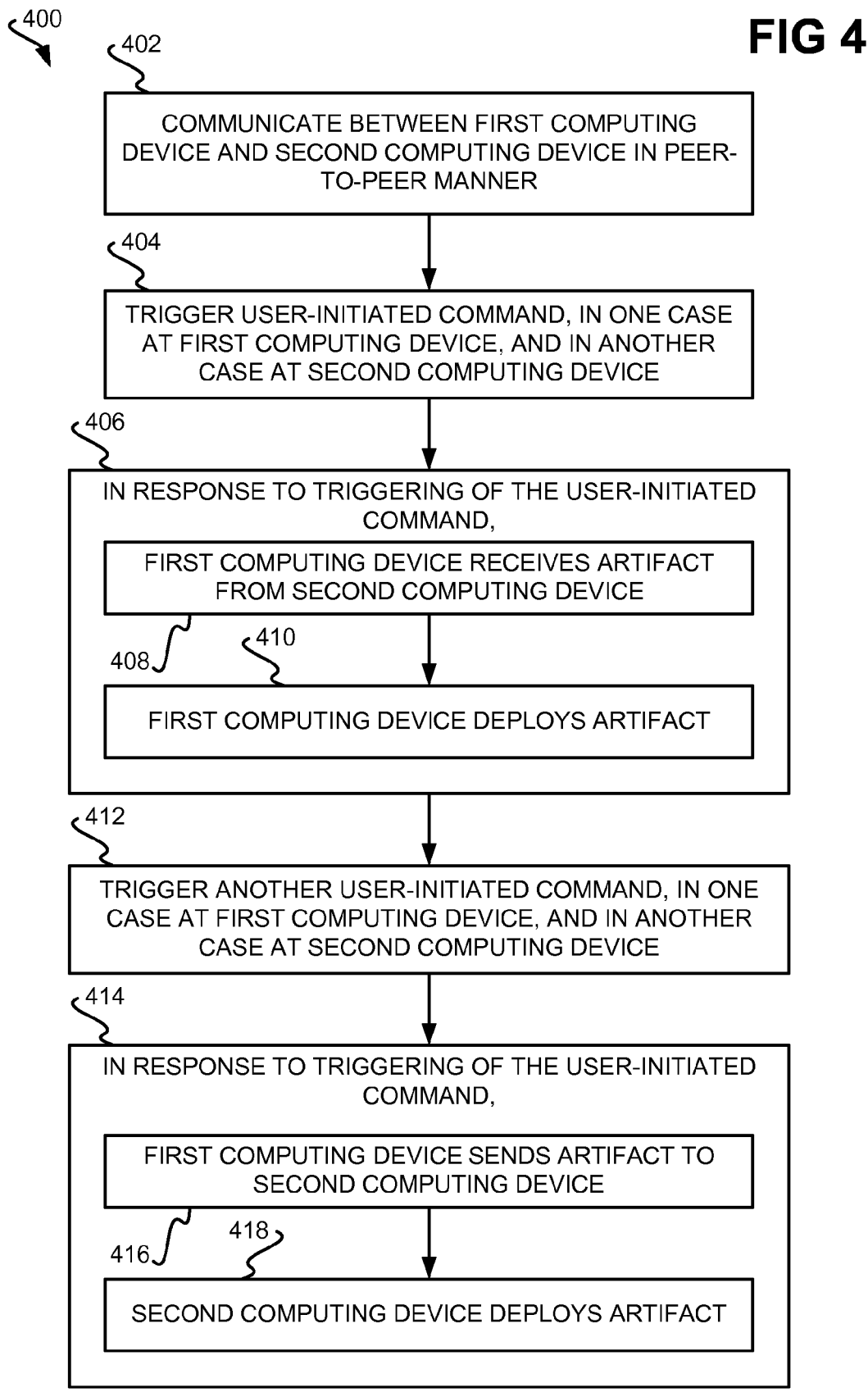
FIG. 4 is a flowchart of a method, according to another embodiment of the present invention.

FIG. 4 shows a method 400, according to an embodiment of the invention. The method 400 is described in relation to a first computing device and a second computing device. The functionality ascribed to each such computing device can be performed by the agent that has been installed on the computing device in question, as described above in relation to FIG. 3.

Communication between the first and the second computing devices occurs in a peer-to-peer manner (402). A command is initiated at some point by a user to deploy an artifact from the second computing device to the first computing device (404). The user-initiated command may be triggered in one case at the first computing device, and in another case at the second computing device. That is, it does not matter whether the command is triggered at the computing device to which the artifact in question will be deployed (i.e., the first computing device), or at the computing device from which the artifact will be deployed (i.e., the second computing device).

In response to the triggering of the user-initiated command (406), the first computing device receives the artifact from the second computing device (408), and then deploys the artifact at the first computing device (410). As has been described above, no further user interaction occurs after the user has initiated the command in part 404 at either the first computing device or the second computing device.

Because the first and the second computing devices are peers to one another, another user-initiated command may be triggered to deploy an artifact from the first computing device to the second computing device (412). That is, the first computing device may both receive artifacts from the second computing device for deployment at the first computing device, and send artifacts to the second computing device for deployment at the second computing device.

In response to the triggering of the user-initiated command (414), the first computing device sends the artifact to the second computing device (408), and the second computing device deploys the artifact at the second computing device (418). As in parts 408 and 410, no further user interaction occurs after the user has initiated the command in part 412 at either the first computing device or the second computing device.

The method 400 of FIG. 4 thus serves to illustrate the flexibility of at least some embodiments of the invention. First, a command to trigger the artifact deployment process does not have to be initiated by the user at a particular computing device. The user may initiate the command at either the computing device to which artifact deployment is to occur, or the computing device from which artifact deployment is to occur. Second, the computing devices themselves are peers to one another, so that each computing device can both receive artifacts for deployment at itself, and send artifacts to other computing devices for deployment at these other computing devices, which is generally not possible in a client-server model.

It is noted that as the method 400 of FIG. 4 is performed multiple times between pairs of different computing devices, different versions of the same artifact may be deployed at different computing devices. At some point, it may be desirable to update a given computing device so that it has the most recent version of the artifact. Embodiments of the invention permit such updating to occur in an automated manner, as is now described in detail.

FIG. 5 shows a method 500, according to an embodiment of the invention. The method 500 is described in relation to the same first computing device and the same second computing device in relation to which the method 400 was described. The functionality ascribed to each such computing device can be performed by the agent that has been installed on the computing device in question, as described above in relation to FIG. 3. The method 500 is particularly described from the perspective of the first computing device, but is more generally applicable to any computing device.

For each artifact deployed at the first computing device, the first computing device maintains a history of each different computing device to which the artifact has been sent by the first computing device, and of each different computing device from which the artifact has been received by the first computing device (502). For example, in the context of the method 400 of FIG. 4, the history for the artifact received by the first computing device from the second computing device in part 408 will reflect that a particular version of the artifact was so received. A corresponding history for the artifact at the second computing device is also maintained. As another example, also in the context of the method 400, the history for the artifact sent by the first computing device to the second computing device in part 418 will reflect that a particular version of the artifact was so sent. A corresponding history for the artifact at the second computing device is also maintained.

At some point, a user initiates a command for an update process to be performed (504). The update process thus occurs in response to this triggering of the user-initiated command (506). The update process is described in relation to a given artifact that is deployed at the first computing device. However, more generally, the update process is applicable to any artifact that is deployed at the first computing device.

The most recent version of the artifact that is deployed over the different computing devices maintained in the history for the given artifact at the first computing device is determined (508). For example, the history may reflect that the first computing device previously received the given artifact from two computing devices, and previously sent the given artifact to three computing devices. The most recent version of the artifact deployed at any of these five computing devices is determined in part 508. Determining the most recent version can in one embodiment include the first computing device communicating with each computing device listed in the history for the artifact in question that is maintained at the first computing device, to receive information as to the version of the artifact currently deployed at each such computing device.

In one embodiment, where this most recent version of the artifact as deployed at one or more computing devices other than the first computing device is older than the version of the artifact deployed at the first computing device itself, the version of the artifact deployed at the first computing device is sent to each computing device listed in the history for the artifact maintained at the first computing device (510). That is, where the first computing device has the newest version of the artifact, the first computing device sends its version of the artifact to each computing device listed in the history that the first computing device maintains for the artifact. Each such computing device then deploys this newest version of the artifact after receiving it from the first computing device.

By comparison, in one embodiment, where the most recent version of the artifact as deployed at one or more other computing devices is newer than the version of the artifact deployed at the first computing device, this most recent version of the artifact is received by the first computing device from one of these other computing devices and deployed at the first computing device (512). That is, where the first computing device does not have the newest version of the artifact, the first computing device receives the newest version of the artifact from one of the computing devices that does have the newest version of the artifact and that is listed in the history that the first computing device maintains for the artifact. The first computing device then deploys this newest version of the artifact.

The update process can be used to two-way synchronize versions of the given artifact between the first computing device and one or more other computing devices. This ensures that none of the other computing devices has a version of the artifact that is older than the version at the first computing device, and that the first computing device does not have a version of the artifact that is older than the versions at any of the other computing devices. In this case, both parts 510 and 512 are performed.

For example, consider the situation in which there are three computing devices: the first computing device having version 1.1 of an artifact, the second computing device having version 1.0 of the artifact, and a third computing device having version 1.2 of the artifact. It is assumed that version 1.2 is newer than version 1.1, and version 1.1 is newer than version 1.0. Version 1.2 may be received by the first computing device from the third computing device, by performing part 508 and then part 512. If part 508 is again performed, then version 1.2 is sent from the first computing device to the second computing device when part 510 is thereafter performed.

The update process can also be used to one-way synchronize versions of the given artifact between the first computing device and one or more other computing devices. This ensures that none of the other computing devices has a version of the artifact that is older than the version at the first computing device, but does not ensure that the first computing device necessarily has the newest version. In this case, just part 510 is performed.

For example, consider again the situation in which there are three computing devices: the first computing device having version 1.1 of an artifact, the second computing device having version 1.0 of the artifact, and the third computing device having version 1.2 of the artifact. It is also again assumed that version 1.2 is newer than version 1.1, and version 1.1 is newer than version 1.0. If just part 510 is performed and part 512 is not ever performed, then version 1.1 is sent from the first computing device to the second computing device. However, it is not ensured (and it is not the case) that the first computing device has the newest version; the first computing device still has version 1.1, which is not the newest version.

The update process finally can be used to perform a different one-way synchronization of versions of the given between the first computing device and one or more other computing devices. This different one-way synchronization is the reverse of the one-way synchronization described in the previous paragraph, and ensures that the first computing device does not have a version of the artifact that is older than the then the version at any of the other computing devices, but does not ensure that each other computing device necessarily has the newest version. In this case, just part 512 is performed.

For example, consider again the situation in which there are three computing devices: the first computing device having version 1.1 of an artifact, the second computing device having version 1.0 of the artifact, and the third computing device having version 1.2 of the artifact. It is also again assumed that version 1.2 is newer than version 1.1, and version 1.1 is newer than version 1.0. If just part 512 is performed and part 510 is not ever performed, then version 1.2 is received by the first computing device from the third computing device. However, it is not ensured (and it is not the case) that each other computing device has the newest version; the second computing device still has version 1.0, which is not the newest version.

It is noted that the computing devices operative in embodiments of the invention are not backups of one another. That is, as noted in the background, there are a variety of different environments in which artifacts may be deployed: an artifact may first be deployed within a development environment, then deployed to a testing environment, then deployed to a quality assurance environment, and finally to a production environment. (Note that deployment may occur in other directions as well: for example, if testing in the testing environment fails, then the artifact may be deployed back to the development environment.) Each environment may, in the context of embodiments of the invention, include one of the computing devices that have been described herein.

As such, for instance, the testing environment computing device is not a backup of the development environment computing device, the quality assurance environment computing device is not a backup of the development environment computing device, the production environment computing device is not a backup of the quality assurance environment computing device, and so on. Rather, the computing device (or devices) of each such environment has its own responsibilities. However, at times, artifacts are deployed from one environment to another environment, as noted in the background section. Therefore, embodiments of the invention should not be construed as providing for a way by which a primary computing device, for instance, is backed up to a backup computing device.

For example, after a given artifact has been deployed from a development environment computing device to a testing environment computing device, further development of the artifact may occur at the development environment computing device, resulting in a new version of this artifact being created. At the same time, the previous version of the artifact, which has been deployed to the testing environment computing device, will be the subject of testing at the testing environment computing device. The testing environment computing device thus does not simply backup the artifact from the primary computing device, but rather performs a completely different responsibility than the development environment computing device does. For example, the testing environment computing device is not intended to "take over" for the development environment computing device if the latter device should fail, as is common in backup and failover topologies.

That is, the development environment computing device is responsible for artifact development; the testing environment computing device is responsible for artifact testing; and, the quality assurance environment computing device is responsible for quality assurance. In general, the difference between testing and quality assurance is that testing ensures that an artifact functions properly and does not crash, whereas quality assurance ensures that the artifact performs the task for which it is intended. For example, an artifact may be functioning properly and not crash, but nevertheless not perform the task for which it is intended (i.e., its functioning, while proper, is not consistent with the task for which the artifact is intended).

Finally, the production environment computing device is the device at which the artifact is ultimately and actually used by end users. The computing device or devices of each environment have responsibilities that are different from the computing devices of other environments. As such, computing device or devices of one environment do not back up the computing device or devices of another environment.

It is further noted that embodiments of the invention do not pertain to load balancing of requests that may be handled by multiple computing devices within, for instance, the production environment, but rather concerns the initial deployment of artifacts to such multiple computing devices within the production environment. For example, after an artifact has been developed in the development environment, deployed to and tested in the testing environment, and deployed to and tested further in the quality assurance environment, the artifact ultimately is deployed to the production environment. Embodiments of the invention pertain just to this artifact deployment process among the computing devices of the various environments, and not to artifact execution after deployment.

For example, once an artifact has been deployed to multiple computing devices of the production environment, these computing devices then execute the artifact. When a given request to be handled by the artifact is received from a client device, which of the computing devices within the production environment handles this request can be determined in accordance with a known or other load-balancing methodology. In this respect, embodiments of the invention are complementary to load balancing, but do not pertain to load-balancing. Rather, embodiments of the invention pertain to the deployment of artifacts to computing devices before the artifacts are actually executed and thus before load-balancing is operative.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A computing device comprising:
   a processor;
   communication hardware to communicate with a different computing device over a network, where the computing device and the different computing device communicate with one another in a peer-to-peer architecture such that the computing device and the different computing device are peers to one another;
   an agent executed by the processor to receive an artifact deployed at the different computing device and to deploy the artifact at the computing device, the agent to receive the artifact via the different computing device and responsive to a user-initiated command received at the different computing device to send the artifact to the computing device and to deploy the artifact at the computing device; and
   a run-time engine executed by the processor,
   wherein the computing device is, responsive to the user-initiated command received at the different computing device, to receive a first message from the different computing device requesting that the agent determine whether the artifact is compatible with the computing device,
   wherein responsive to receiving the first message, the agent is to determine that the artifact is compatible with the computing device and the computing device is to send a second message back in reply to the first message back to the different computing device indicating that the artifact is compatible with the computing device,
   and wherein after the second message has been sent to and received by the different computing device, the agent is to receive the artifact over the network and from the different computing device and to deploy the artifact at the computing device without further user interaction.

2. The computing device of claim 1, wherein the artifact is a first artifact, the user-initiated command is a first user-initiated command, and the agent is further to send a second artifact deployed at the computing device to the different computing device for deployment at the different computing device,
   wherein the agent is to send the second artifact to the different computing device via a second user-initiated command,
   and wherein after the second user-initiated command has been triggered, the agent is to send the artifact to the other computing device for deployment at the different computing device without further user interaction.

3. The computing device of claim 1, wherein the different computing device is one of a plurality of different computing devices, and the artifact is one of a plurality of artifacts deployed at the computing device,
   and wherein the agent is to maintain, for each artifact, a history of each different computing device to which the artifact has been sent by the computing device and of each different computing device from which the artifact has been received by the computing device.

4. The computing device of claim 3, wherein the agent is to perform an update process for a given artifact by:
   determining a most recent version of the given artifact deployed over the different computing devices maintained in the history for the given artifact; and,
   where the most recent version of the given artifact deployed over the different computing devices maintained in the history is older than a version of the given artifact deployed at the computing device, sending the version of the given artifact from the computing device to each different computing device maintained in the history for the given artifact, wherein the user-initiated command is a first user-initiated command, and the agent is to perform the update process in response to a second user-initiated command being triggered, and wherein after the second user-initiated command has been triggered, the agent is to perform the update process without further user interaction.

5. The computing device of claim 3, wherein the agent is to perform an update process for a given artifact by:
  determining a most recent version of the given artifact deployed over the different computing devices maintained in the history for the given artifact;
  where the most recent version of the given artifact deployed over the different computing devices maintained in the history is newer than a version of the given artifact deployed at the computing device,
    receiving the most recent version of the given artifact from one of the different computing devices maintained in the history; and,
    deploying the most recent version of the given artifact at the computing device, such that the most recent version of the given artifact replaces the version of the given artifact previously deployed at the computing device,
  wherein the user-initiated command is a first user-initiated command, and the agent is to perform the update process in response to a second user-initiated command being triggered,
  and wherein after the second user-initiated command has been triggered, the agent is to perform the update process without further user interaction.

6. The computing device of claim 1, wherein the computing device is part of an environment that has a first responsibility, and the different computing device is part of a different environment that has a second responsibility different than the first responsibility.

7. The computing device according to claim 1, wherein:
  the artifact has a plurality of versions;
  one or more of the plurality of versions of the artifact are deployed on each of the computing device, and the different computing device;
  the computing device stores information identifying all the versions of the artifact deployed on the different computing device; and
  the different computing device stores information identifying all the versions of the artifact deployed on the computing device.

8. A method of transmitting an artifact in a system of computing devices comprising at least first and second computing devices communicatively interconnected to one another in a peer-to-peer manner, the method comprising:
  the first computing device receiving a user-initiated command to send an artifact deployed on the first computing device to the second computing device and to deploy the artifact at the second computing device;
  the first computing device, in response to receiving the user-initiated command, sending a first message to the second computing device to indicate whether the second computing device is able to deploy the artifact;
  the second computing device receiving the first message and in response to receiving the first message, sending a second message to the first computing device indicating that the second computing device is able to deploy the artifact;
  the first computing device, after receiving the second message, sending the artifact to the second computing device;
  the second computing device receiving the artifact from the first computing device and deploying the artifact on the second computing device,
  wherein after the user-initiated command is received by the first computing device, the artifact is received by the second computing device and deployed at the second computing device without further user interaction.

9. The method of claim 8, wherein the artifact is a first artifact, the user-initiated command is a first user-initiated command, and the method further comprises:
  triggering of a second user-initiated command;
  in response to triggering of the user-initiated command, sending a second artifact from the first computing device to the second computing device for deployment at the second computing device,
  wherein after the second user-initiated command has been triggered, the artifact is sent from the first computing device to the second computing device without further user interaction.

10. The method of claim 8, further comprising maintaining a history at the first computing device that the artifact has been received from the second computing device.

11. The method of claim 8, wherein the second computing device is one of a plurality of different computing devices other than the first computing device, and the artifact is one of a plurality of artifacts deployed at the first computing device,
  and wherein the method further comprises maintaining at the first computing device, for each artifact, a history of each different computing device to which the artifact has been sent by the first computing device and of each different computing device from which the artifact has been received by the first computing device.

12. The method of claim 11, further comprising updating a given artifact by: determining a most recent version of the given artifact deployed over the different computing devices maintained in the history for the given artifact at the first computing device; and,
  where the most recent version of the given artifact deployed over the different computing devices maintained in the history is older than a version of the given artifact deployed at the first computing device, sending the version of the given artifact from the first computing device to each different computing device maintained in the history for the given artifact at the first computing device,
  wherein the user-initiated command is a first user-initiated command, and updating the given artifact is performed in response to a second user-initiated command being triggered,
  and wherein after the second user-initiated command has been triggered, updating of the given artifact is performed without further user interaction.

13. The method of claim 11, further comprising updating a given artifact by:
  determining a most recent version of the given artifact deployed over the different computing devices maintained in the history for the given artifact at the first computing device;
  where the most recent version of the given artifact deployed over the different computing devices maintained in the history is newer than a version of the given artifact deployed at the first computing device, receiving the most recent version of the given artifact from one of the different computing devices maintained in the history for the given artifact at the first computing device; and, deploying the most recent version of the given artifact at the first computing device, such that the most recent version of the given artifact replaces the version of the given artifact previously deployed at the first computing device, wherein the user-initiated command is a first user-initiated command, and updating the given artifact is performed in response to a second user-initiated command being triggered, and wherein after the second user-initiated command has been triggered, updating of the given artifact is performed without further user interaction.

14. The method according to claim 8, further comprising:

the first computing device sending a first group of artifacts to the second computing device, and the second computing device sending a second group of artifacts to the first computing device, each artifact of the first and second groups of artifacts including a plurality of versions of said each artifact;

the first computing device maintaining a first history of the artifacts received by the first computing device and of the artifacts sent by the first computing device, the first history including data identifying each artifact, and the version of said each artifact, received by the first computing device and data identifying each artifact, and the version of said each artifact, sent by the first computing device; and the second computing device maintaining a second history of the artifacts received by the second computing device and of the artifacts sent by the second computing device, the second history including data identifying each artifact, and the version of said each artifact, received by the second computing device and data identifying each artifact, and the version of said each artifact, sent by the second computing device; and wherein each of the first and second computing devices includes data identifying the artifacts, and the versions of the artifacts, on the other of the first and second computing devices.

15. A computer program product comprising:

a storage device storing computer-readable code executable by a computing device communicating with a different computing device in a peer-to-peer manner such that the first and the second computing devices are peers to one another, the computer-readable code comprising:

first computer-readable code to, in response to a user-initiated command received at the different computing device to send to the computing device an artifact that is already deployed at the different computing device and to deploy the artifact at the computing device, receive a first message from the different computing device requesting that the computing device determine whether the artifact is compatible with the computing device;

second computer-readable code to, in response to receiving the first message, determine that the artifact is compatible with the computing device and to send a second message in reply to the first message to the different computing device over the network indicating that the artifact is compatible with the computing device;

third computer-readable code to, after sending the second message, receive the artifact over the network from the different computing device and to deploy the artifact at the computing device, wherein after the user-initiated command has been received at the different computing device, the artifact is received by the computing device and deployed at the computing device without further user interaction.

16. The computer program product of claim 15, wherein the artifact is a first artifact, the user-initiated command is a first user-initiated command, and the computer-readable code further comprises:

fourth computer-readable code to, in response to triggering of a second user-initiated command, send a second artifact from the computing device to the different computing device for deployment at the different computing device, wherein after the second user-initiated command has been triggered, the artifact is sent from the computing device to the different computing device without further user interaction.

17. The computer program product of claim 15, wherein the computer-readable code further comprises:

fourth computer-readable code to maintain a history at the computing device that the artifact has been received from the different computing device.

18. The computer program product of claim 15, wherein the different computing device is one of a plurality of different computing devices, the artifact is one of a plurality of artifacts deployed at the computing device, and the computer-readable code further comprises:

third computer-readable code to maintain at the computing device, for each artifact, a history of each different computing device to which the artifact has been sent by the computing device and of each different computing device from which the artifact has been received by the computing device.

19. The computer program product of claim 18, wherein the computer-readable code further comprises fourth computer-readable code to update a given artifact by:

determining a most recent version of the given artifact deployed over the different computing devices maintained in the history for the given artifact at the computing device; and, where the most recent version of the given artifact deployed over the different computing devices maintained in the history is older than a version of the given artifact deployed at the computing device, sending the version of the given artifact from the computing device to each different computing device maintained in the history for the given artifact at the computing device, wherein the user-initiated command is a first user-initiated command, and the given artifact is updated in response to a second user-initiated command being triggered, and wherein after the second user-initiated command has been triggered, the given artifact is updated without further user interaction.

20. The computer program product of claim 18, wherein the computer-readable code further comprises fourth computer-readable code to update a given artifact by:

determining a most recent version of the given artifact deployed over the different computing devices maintained in the history for the given artifact at the computing device;

where the most recent version of the given artifact deployed over the different computing devices maintained in the history is newer than a version of the given
artifact deployed at the computing device,
  receiving the most recent version of the given artifact
    from one of the different computing devices maintained in the history for the given artifact at the
    computing device; and,
  deploying the most recent version of the given artifact
    at the computing device, such that the most recent
    version of the given artifact replaces the version of
    the given artifact previously deployed at the computing device,
wherein the user-initiated command is a first user-initiated
  command, and the given artifact is updated in response
  to a second user-initiated command being triggered,
and wherein after the second user-initiated command has
  been triggered, the given artifact is updated without
  further user interaction.

* * * * *